United States Patent
Claeys et al.

(10) Patent No.: US 12,105,829 B2
(45) Date of Patent: *Oct. 1, 2024

(54) PERSISTING ENCRYPTED REMOTE BROWSER DATA AT A LOCAL BROWSER FOR USE IN A REMOTE BROWSER

(71) Applicant: CLOUDFLARE, INC., San Francisco, CA (US)

(72) Inventors: Joshua Thomas Claeys, Bothell, WA (US); Benjamin Buzbee, Woodinville, WA (US); Pierre Cauchois, Kirkland, WA (US); Killian Koenig, Seattle, WA (US); Trevor Sundberg, Kirkland, WA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,146

(22) Filed: May 16, 2023

(65) Prior Publication Data

US 2024/0126913 A1 Apr. 18, 2024

Related U.S. Application Data

(63) Continuation of application No. 17/207,413, filed on Mar. 19, 2021, now Pat. No. 11,651,099.

(51) Int. Cl.
*G06F 21/62* (2013.01)
*H04L 9/40* (2022.01)
*H04L 67/146* (2022.01)

(52) U.S. Cl.
CPC ...... *G06F 21/6227* (2013.01); *H04L 63/0428* (2013.01); *H04L 67/146* (2013.01)

(58) Field of Classification Search
CPC ............ G06F 21/6227; H04L 63/0428; H04L 67/146
(Continued)

(56) References Cited

U.S. PATENT DOCUMENTS 7,155,605 B1 * 12/2006 Cromer ............... G06F 21/6263
707/999.009
8,145,718 B1 3/2012 Kacker et al.
(Continued)

OTHER PUBLICATIONS

Non-Final Office Action, U.S. Appl. No. 17/207,413, Oct. 27, 2022, 10 pages.
(Continued)

*Primary Examiner* — Amare F Tabor
(74) *Attorney, Agent, or Firm* — NICHOLSON DE VOS WEBSTER & ELLIOTT LLP (57) ABSTRACT

A remote browsing session is initiated between a remote browser client executing on a client device and a remote browser host executing on a remote browser server. The remote browser host receives from the client device, encrypted remote browser data of remote browser data that affects the remote browser session. The remote browser client does not have access to a decryption key for the encrypted remote browser data. The encrypted remote browser data is decrypted to reveal the remote browser data. The remote browser host is configured with the remote browser data. The remote browser host manages updates to the remote browser data during the remote browsing session. Periodically, updates to the remote browser data are encrypted and transmitted to the remote browser client for storage.

26 Claims, 3 Drawing Sheets

(58) Field of Classification Search
USPC .......................................................... 713/164
See application file for complete search history.

(56) References Cited

U.S. PATENT DOCUMENTS

| | | |
|---|---|---|
| 8,589,671 B2 | 11/2013 | Schneider |
| 8,756,660 B2 | 6/2014 | Malakapalli et al. |
| 9,270,724 B1 | 2/2016 | Morgan et al. |
| 9,350,533 B2 | 5/2016 | Oliver |
| 9,577,989 B2 | 2/2017 | Ackerly et al. |
| 9,992,258 B2 | 6/2018 | Koum et al. |
| 10,129,211 B2 | 11/2018 | Heath |
| 10,404,808 B2 * | 9/2019 | Ruge ....................... H04L 67/02 |
| 11,323,522 B2 * | 5/2022 | Ruge ................... H04L 63/0421 |
| 11,468,142 B1 | 10/2022 | Thornhill et al. |
| 2004/0019780 A1 | 1/2004 | Waugh et al. |
| 2010/0223456 A1 * | 9/2010 | Schneider ........... H04L 63/0428 380/277 |
| 2015/0295930 A1 | 10/2015 | Dixon et al. |
| 2017/0083573 A1 | 3/2017 | Rogers et al. |
| 2020/0250372 A1 | 8/2020 | Remington et al. |

OTHER PUBLICATIONS

Notice of Allowance, U.S. Appl. No. 17/207,413, Jan. 9, 2023, 8 pages.

* cited by examiner

PERSISTING ENCRYPTED REMOTE BROWSER DATA AT A LOCAL BROWSER FOR USE IN A REMOTE BROWSER

CROSS-REFERENCE TO RELATED APPLICATIONS

This application is a continuation of U.S. application Ser. No. 17/207,413, filed Mar. 19, 2021, which is hereby incorporated by reference.

FIELD

The present disclosure relates to the field of remote browsing; and more specifically to persisting encrypted remote browser data at a local browser for use in a remote browser.

BACKGROUND

Bad actors and cyber-attackers create malicious websites that install malware onto or otherwise attack a user's machine (whether that machine is a PC, Mac, tablet, phone, virtual-reality headset, augmented/mixed reality headset, or other computing device). These attackers can infect a user's machine at many levels, including taking advantage of security holes in operating systems and applications interfaces to system resources and drivers. One manner of securing an application is to execute the application remotely on a server instead of locally on a client device where the hosted remoted application can be protected inside of a sandbox, such as a virtual machine. When the application is a web browser, this is sometimes referred to as "browser isolation."

Several attempted solutions have been employed to allow web browsers to be isolated by running them as remote processes. One such solution is to employ "pixel pushing" or "pixel mirroring" which allows a web page to be rendered remotely utilizing a web browser running on an external server to execute any active code associated with the web page and to produce a series of images which are sent back to a client web browser as compressed pixels or video (using for example H264 video format) to be eventually rendered by the web browser on the client device. Another solution is to employ "Document Object Model" (DOM) remoting/mirroring. With this solution, the DOM corresponding to a page is sanitized before it is sent to the client to remove potentially malicious code and reconstructed on the client before rendering. Using DOM mirroring, a sanitizing process on the isolated browser computing system (e.g., a server) identifies bad HTML and active content and cleans up the DOM tree and reformats it without the active content or with content that has been transcoded into a safe format.

When a user browses the internet using a conventional browser, some amount of data is stored locally. For instance, session information may be stored so that a user is not required to log into a service each time it is visited. As another example, theme preferences for a website (e.g., dark or light) may be stored. The data is typically stored in cookies.

SUMMARY

A remote browsing session is initiated between a remote browser client executing on a client device and a remote browser host executing on a remote browser server. The remote browser host receives, from the client device, encrypted remote browser data of remote browser data that affects the remote browsing session. For instance, the remote browser data may include cookies, browser extension data, data to be stored in a local database of the client, browser history, autofill history, theme preferences, bookmarks, passwords, a listing of open tabs, payment information, addresses, and/or phone numbers. The client does not have access to a decryption key for the encrypted remote browser data. The encrypted remote browser data is decrypted to reveal the remote browser data, and the remote browser host is configured with the remote browser data. The remote browser host manages updates to the remote browser host during the remote browsing session. Periodically, the remote browser data is encrypted and transmitted to the remote browser client for storage. The remote browser client may store the encrypted remote browser data in local storage, IndexedDB, or other client storage.

BRIEF DESCRIPTION OF THE DRAWINGS

The invention may best be understood by referring to the following description and accompanying drawings that are used to illustrate embodiments. In the drawings.

DESCRIPTION OF EMBODIMENTS

A remote browsing session is established between a local browser executing on a client device and a remote browser executing on a server. During a remote browsing session, remote browser data is generated and managed by the remote browser. The remote browser data may include cookie data, browser extension data (e.g., the login state of the extension, setting(s) of the extension, what extension(s) are installed, etc.), data to be stored in a local database of the client device (e.g., local storage, session storage, synched storage, IndexedDB), settings (e.g., appearance settings, default search engine, startup page, etc.), browser history, autofill history, theme preferences for a website (e.g., dark or light)), bookmarks, passwords, a listing of open tabs, payment information, addresses, and/or phone numbers. Periodically, the remote browser data is encrypted and transmitted from the remote browser to the local browser executing on the client device. The local browser does not have access to a key for decrypting the remote browser data. The local browser persists the data on the client device (e.g., in local storage, through IndexedDB, etc.). The remote browser may remove the remote browser data for the local browser (both encrypted and decrypted) when the remote browsing session ends. When a new remote browsing session is established or shortly thereafter, the local browser causes the stored encrypted remote browser data to be transmitted to the remote browser. The remote browser decrypts the encrypted remote browser data and configures the remote browser with the decrypted data (e.g., installs the cookies, sets the bookmarks, etc.).

Even though the remote browsing session is temporary, and the remote browser may not store any data about previous remote browsing sessions, browser data that is conventionally stored at a local client device for a conventional browser can be used by remote browsers in subsequent remote browsing sessions. Also, the browser data is encrypted thereby protecting the browser data from unintentional or malicious leaks.

Figure 1:
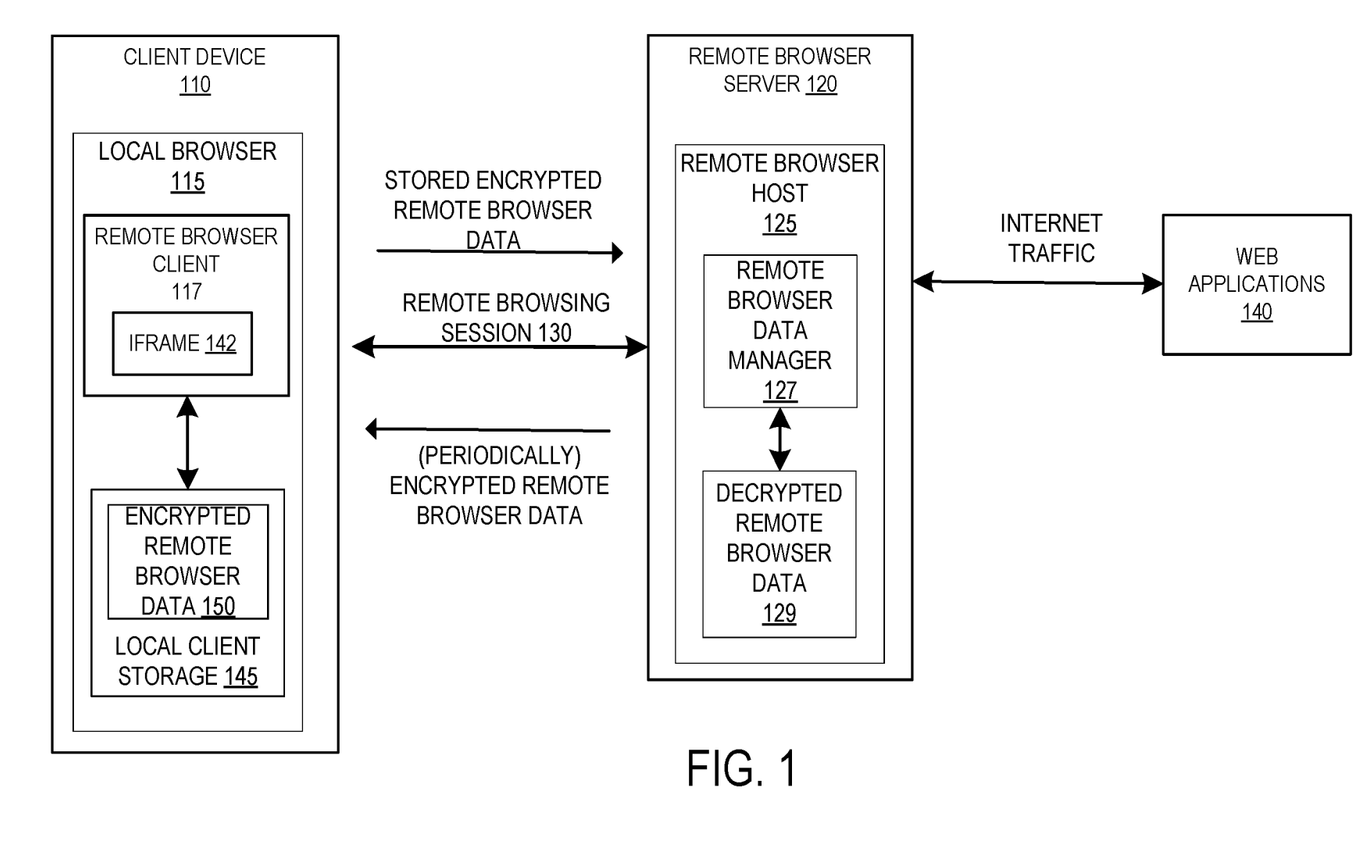
FIG. 1 illustrates an exemplary remote browsing environment for persisting encrypted remote browser data at a local client device that can be used in a remote browser, according to an embodiment.

FIG. 1 illustrates an exemplary remote browsing environment where remote browser data is stored in an encrypted format at a client device that can be decrypted by a server running a remote browser host. The system includes the client device 110 that executes a local browser 115. The client device 110 is a computing device (e.g., laptop, desktop, smartphone, mobile phone, tablet, gaming system, wearable device, Internet-of-Things (IoT) device, set-top box, etc.) that can access network resources through the local browser 115 (e.g., a browser, a mobile application, or other network application). Although the term "browser" is used, the local browser 115 may be any application that can access network resources.

The local browser 115 may be a dedicated application for remote browsing. Alternatively, the local browser 115 may be a standard application with the capability of executing a remote browsing session. In either case, the local browser 115 establishes a remote browsing session 130 with the remote browser server 120. For instance, a remote browser host 125 is generated (e.g., a containerized instanced) for the remote browsing session 130 and a remote browser client is created within the local browser 115. During the remote browsing session 130, input received by the remote browser client 117 such as browsing to websites, keystrokes, mouse commands, scroll commands, and other cursor and input events are sent to the remote browser host 125 for further processing. In effect, the remote browser client 117 on the local browser 115 controls the remote browser host 125. The remote browser host 125 receives and transmits internet traffic to web applications 140 (e.g., websites or other web applications) on behalf of the remote browser client 117. The remote browser host 125 can perform actions like a normal browser such as downloading web pages, uploading data, applying style sheet definitions, executing client-side scripts (e.g., JavaScript), etc. The remote browser host 125 can transmit the changes to the remote browser client 117 for display. Thus, the execution actions of the web applications are performed at the remote browser host 125 thereby minimizing vulnerabilities caused by downloading web pages with malicious content, execution of client-side scripts with malicious content, or applying stylesheet definitions. Any malicious tinkering with the executable code in the remote browser host is restricted to the particular isolation environment. Further, when the remote browser client 117 exits, the isolation environment (e.g., the container) is removed so that any malware is not perpetuated by the remote browser host 125.

Remote browser data is generated and/or updated during the remote browsing session 130. Thus, the remote browser data is related to the remote browsing session. For example, remote browser data may include cookies that are set during the remote browsing session 130 (e.g., by the web applications 140). As another example, remote browser data related to browser extensions may be generated and/or updated during the remote browsing session (e.g., whether a session is logged in, setting(s) of a browser extension, what extension(s) are installed). As other examples, remote browser data may include data to be stored in a local database of the client device 110 (e.g., local storage, session storage, synched storage, IndexedDB); settings (e.g., appearance settings, default search engine, startup page, etc.); browser history; autofill history; theme preferences for a website (e.g., dark or light)); bookmarks; passwords; a listing of open tabs; payment information; addresses; and phone numbers.

While the remote browsing session 130 is active, the remote browser host 125 manages the remote browser data using the remote browser data manager 127. For instance, the remote browser data manager 127 may configure the remote browser host 125 with the settings and/or preferences defined in the remote browser data. As another example, the remote browser data manager 127 may manage encrypting the remote browser data and communicating the encrypted remote browser data to the remote browser client 117. In an embodiment, the remote browser data is removed from the remote browser host 125 when the remote browser host 125 exits (e.g., when the remote browsing session 130 ends).

The remote browser data is encrypted and sent to the remote browser client 117 during the remote browsing session 130. For instance, the remote browser data manager 127 of the remote browser host 125 may encrypt the remote browser data and periodically transmit at least portions of the remote browser data to the remote browser client 117. The remote browser data may be encrypted with a key that is not available to the client device 110, the local browser 115, or to the remote browser client 117. That is, the encrypted remote browser data cannot be decrypted locally by the remote browser client 117, the local browser 115, or the client device 110. Instead, the remote browser data is encrypted such that the remote browser host 125 can decrypt the encrypted remote browser data or otherwise have access to the decrypted remote browser data. In an embodiment, the remote browser client 117 does not receive unencrypted remote browser data from the remote browser host 125.

The remote browser client 117 stores the encrypted remote browser data 150 in local client storage 145. The local client storage 145 may be local storage, IndexedDB, or other client storage available to the remote browser client 117. The encrypted remote browser data 150 may be an opaque binary blob, which may be serialized and possibly compressed. In an embodiment, the remote browser client 117 transmits the encrypted remote browser data 150 to the remote browser host 125 as part of the establishment of the remote browsing session 130 or shortly thereafter. For instance, the remote browser client 117 may transmit the encrypted remote browser data 150 to the remote browser server 120 using an HTTP/S POST request. As another example, the remote browser client 117 may transmit the encrypted remote browser using an WebRTC connection between the remote browser client 117 and the remote browser server 120 or other secure connection.

The remote browser data manager 127 decrypts the encrypted remote browser data 150 or otherwise receives the decrypted remote browser data. The remote browser data manager 127 may use the decrypted remote browser data to configure the browsing session for the client as appropriate.

In an embodiment, the remote browser server 120 is one of multiple remote browser servers to which the client device 110 can connect and establish a remote browsing session with. For instance, there may be multiple remote browser servers that are part of multiple data centers to which the client device 110 can connect. The remote browser servers may be geographically distributed (e.g., throughout the world). The remote browser servers may be anycasted to the same IP address. The client device 110 may connect to a particular remote browser server due to the client device being closest to that remote browser server (out of the remote browser servers) in terms of routing protocol configuration (e.g., Border Gateway Protocol (BGP) configuration) according to an anycast implementation as determined by the network infrastructure (e.g., router(s), switch(es), and/or other network equipment). In such an embodiment, even though the client device can establish different remote browsing sessions with different remote browser servers (which may be geographically separate), the remote browser data may be communicated from the client device to the remote browser host dynamically thereby providing a consistent experience.

Although embodiments have described sending encrypted remote browser data to the remote browser client, in other embodiments the remote browser data (or at least a portion of the remote browser data) is sent unencrypted to the remote browser client. In such other embodiments, when a new remote browsing session is established or shortly thereafter, the remote browser client causes the stored remote browser data to be transmitted to the remote browser in a like way as described with reference to the stored encrypted remote browser data. The remote browser would decrypt any encrypted remote browser data (if any) and configure the remote browser with the data like previously described (e.g., installs the cookies, sets the bookmarks, etc.).

Figure 2:
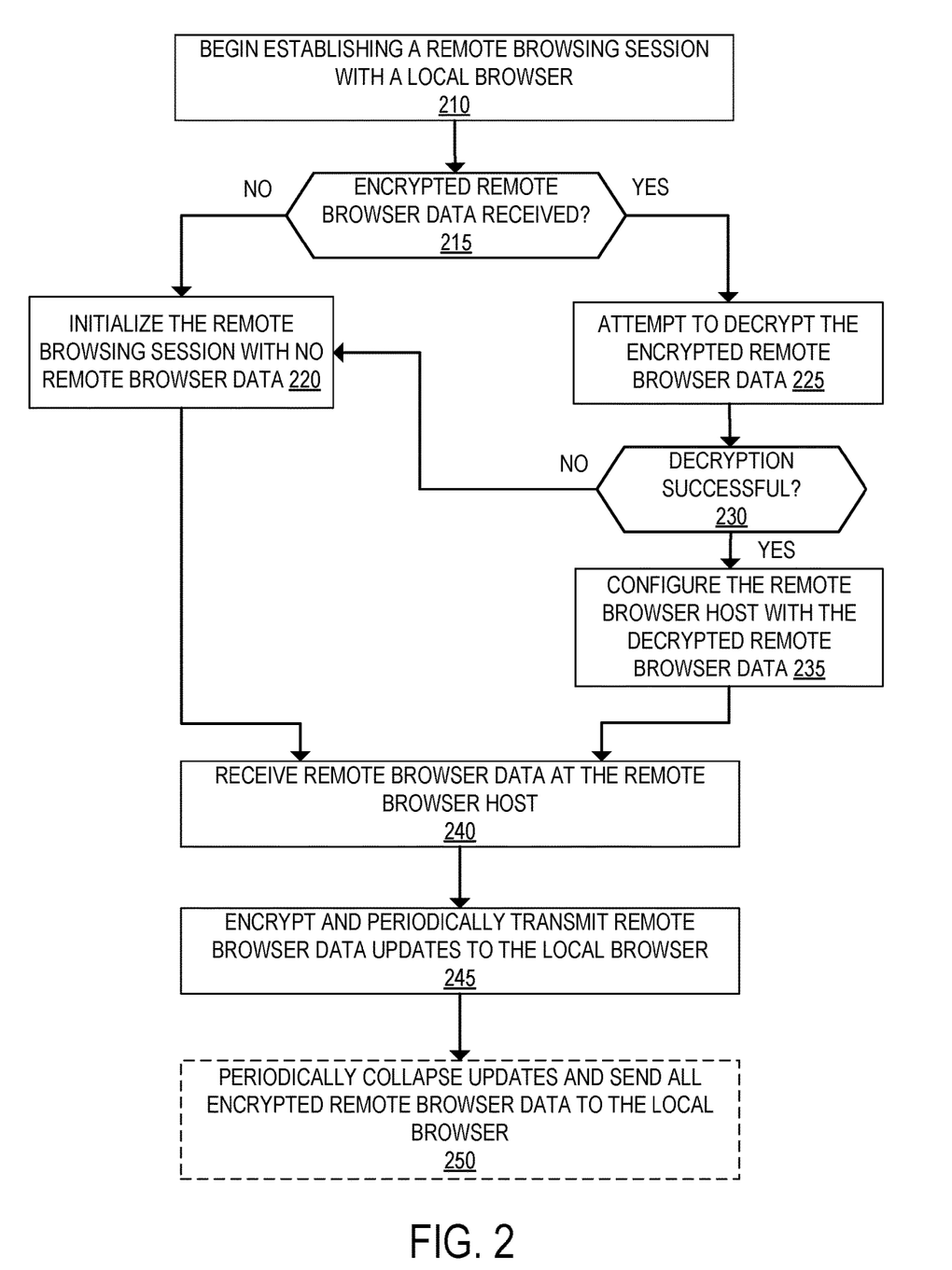
FIG. 2 is a flow diagram that illustrates exemplary operations for managing remote browser data in a remote browser host according to an embodiment.

FIG. 2 is a flow diagram that illustrates exemplary operations for managing remote browser data in a remote browser host according to an embodiment. The operations of FIG. 2 will be described with reference to FIG. 1. The operations of FIG. 2, however, can be performed by embodiments different than that of FIG. 1, and the embodiments shown in FIG. 1 can perform different operations than that of FIG. 2.

At operation 210, the remote browser server 120 begins initiating a remote browsing session with the local browser 115. For instance, the remote browser server 120 may receive a request (e.g., an HTTP/HTTPS request) that originated from the local browser 115 that triggers a remote browsing session. For instance, although not illustrated in FIG. 1, the local browser 115 may be configured such that all internet traffic is received by a gateway device that may be capable of examining the traffic. If the received traffic meets a policy, the traffic may be directed to the remote browser server 120 for establishing a remote browsing session with the local browser 115. There may be one or more policies. The one or more policies may include one or more the following; a policy that defines domain(s) and/or IP address(es) for which a remote browsing session is to apply; a policy that defines domain(s) and/or IP address(es) for which a remote browsing session is not to apply (and therefore all other domain(s) and/or IP address(es) the remote browsing session will not apply); a policy that indicates one or more categories of destinations for which the remote browsing session is to apply and/or not apply (e.g., malware, security threats, games, adult themes, social networks, video streaming, etc.). Alternatively, any received traffic may initiate a remote browsing session.

In an embodiment, as part of establishing a remote browsing session with the local browser 115, the remote browser client 117 is served to the local browser 115. For example, the remote browser client 117 may be a web-based remoting client that connects to the remote browser host 125. The remote browser host 125 handles the internet traffic including downloading and executing all foreign webpage code (e.g., HTML, CSS, JavaScript, etc.). The remote browser host 125 may intercept draw commands and transmit the vector draw commands to the remote browser client 117 for rendering. The remote browser client 117 may be implemented using a client-side script (e.g., a JavaScript file), a WebAssembly library or other binary-code format library for handling draw commands, and an HTML file. The client-side script may interface with an application programming interface (API) of the local browser 115 to cause the local browser 115 to load and hook the rendering file into the event loop, to intercept events from an event loop to listen for events associated with the local browser and invoke the draw handling code in the rendering file (for example, using callbacks from the browser's internal event loop), and is configured to initiate a secure connection (e.g., via WebRTC or other secure connection) from the remote browser client 117 to the remote browser host 125. The binary-code format library (e.g., the WebAssembly file) includes the draw handling code in a compiled instance of a graphics library that is typically configured to cause draw commands to be rendered in the same manner on the remote browser client 117 as on the remote browser host 125 to ensure consistent rendering. The HTML file is typically configured to cause the remote browser client 117 to generate a drawing canvas, which if it incorporates HTML5, may interface to one or more GPUs. The cookie typically includes connection information to facilitate persistent remote browsing sessions with intermittent terminations of the connection (for example, shutting down the client device or closing the local browser 115 and reconnecting to the same remote browsing session).

As part of establishing the remote browsing session, the remote browser server 120 may receive encrypted remote browser data from the remote browser client 117. When decrypted, the remote browser data can be used to customize the remote browser host 125 for the particular remote browser client 117. The remote browser server 120 may also receive an identifier of a key that can be used for decrypting the encrypted remote browser data (e.g., a thumbprint for the decryption key). At operation 215, the remote browser server 120 determines whether encrypted remote browser data has been received from the local browser 115. The encrypted remote browser data may be received as an HTTP/S POST request or through a secure connection such as a WebRTC connection between the local browser 115 and the remote browser server 120. If no encrypted remote browser data is received, then flow moves to operation 220 where the remote browser server 120 initiates the remote browsing session 130 with no remote browser data. If encrypted remote browser data is received, then flow moves to operation 225.

At operation 225, the remote browser server 120 attempts to decrypt the received encrypted remote browser data. For instance, the remote browser data manager 127 attempts to decrypt the received encrypted remote browser data. In an embodiment, the remote browser server 120 receives from the local browser 115 an identifier for the decryption key that can decrypt the encrypted remote browser data. In such an embodiment, the remote browser server 120 uses the identifier to access the decryption key and attempts to decrypt the data. Next at operation 230, a determination is made whether the decryption is successful. If it is not successful, then operation 220 is performed where the remote browser server 120 initiates the remote browsing session 130 with no remote browser data. If the decryption is successful, then operation 235 is performed.

At operation 235, the remote browser data manager 127 configures the remote browser host 125 with the decrypted remote browser data 129. If the remote browser data includes cookies, the remote browser data manager 127 installs the cookies into a cookie store for the remote browser host 125. The remote browser host 125 then uses the cookies for the session as if it is a regular local browser (e.g., transmits cookies to web servers as appropriate).

If the remote browser data includes extension data (e.g., whether an account corresponding to the extension is logged in, whether an extension is to be installed), the remote browser data manager 127 may configure that extension accordingly. As another example, if the remote browser data includes data that identifies the extensions that are installed, the remote browser data manager 127 may install those extensions and/or enable those extensions for the remote browser host 125. For instance, the remote browser host 125 may allow the user to interact with that extension (via the remote browser client 117) if that extension is configured for interaction. If the extension modifies pages (e.g., is an ad-blocker), the extension modifies the pages at the remote browser host 125 on behalf of the remote browser client 117. The modified page would then be subject to be transmitted to the remote browser client 117 through the remote browsing session 130.

If the remote browser data includes settings for the remote browser host such as appearance settings, default search engine, startup page, etc., the remote browser data manager 127 configures the remote browser host 125 with those settings. As another example, if the remote browser data includes browser history data, the remote browser data manager 127 may configure the remote browser host 125 with the browser history data. Likewise, if the remote browser data includes autofill history, the remote browser data manager 127 may configure the remote browser host 125 with the autofill history. If the remote browser data includes passwords, the remote browser data manager 127 may configure the remote browser host 125 with the saved password information. If the remote browser data includes a listing of open or saved tabs, the remote browser data manager 127 may cause the remote browser host 125 to download the content of the saved tabs.

After the remote browser host 125 is configured, the remote browsing session 130 is initiated. During the remote browsing session 130, input received by the remote browser client 117 such as browsing to websites, keystrokes, mouse commands, scroll commands, and other cursor and input events are sent to the remote browser host 125 for further processing. In effect, the remote browser client 117 on the local browser 115 controls the remote browser host 125. The remote browser host 125 receives and transmits internet traffic to web applications 140 (e.g., websites or other web applications) on behalf of the remote browser client 117. The remote browser host 125 can perform actions like a normal browser such as downloading web pages, uploading data, applying style sheet definitions, executing client-side scripts (e.g., JavaScript), etc. The remote browser host 125 can transmit the changes to the remote browser client 117 for display.

Remote browser data is generated and/or updated during the remote browsing session 130. For example, remote browser data may include cookies that are set during the remote browsing session 130 (e.g., by the web applications 140). As another example, remote browser data related to browser extensions may be generated and/or updated during the remote browsing session (e.g., whether a session is logged in, setting(s) of a browser extension, what extension(s) are installed, etc). As a specific example, an extension store may be associated with the remote browsing session that allows users to select and install certain extensions for remote browsing. As other examples, the user may add or modify a bookmark, may add or modify a saved password, generate browser history, generate autofill history, etc.

With reference back to FIG. 2, at operation 240, the remote browser host 125 receives remote browser data during the remote browsing session 130. The remote browser data manager 127 manages the remote browser data while the remote browsing session 130 exists. For instance, the remote browser data manager 127 is authoritative for the remote browser data during the remote browsing session 130. As an example, the remote browser client 117 does not transmit stored cookies to the remote browser host 125 during the remote browsing session 130.

Next, at operation 245, periodically the remote browser host 125 encrypts and transmits updates to the remote browser data to the remote browser client 117. The transmission may be over a WebRTC connection between the remote browser client 117 and the remote browser host 125. The encrypted remote browser data may be an opaque binary blob, which may be serialized and possibly compressed. In an embodiment, a separate encryption key is generated for each separate local browser. An X509 certificate may be used for public/private key generation, revocation of expired or compromised keys, a way to fingerprint or identify each key, and allows for a chain of trust to revoke pools of certificate at once. As an example, if a cookie is set during the remote browsing session 130, the remote browser data manager 127 may encrypt the cookie and send the update to the remote browser client 117. In an embodiment, regardless of the site being accessed, the remote browser client 117 includes the iframe 142 of the same domain (e.g., a domain of the remote browsing service) and the encrypted remote browser data is sent to the iframe 142. In an embodiment, the remote browser data manager 127 encrypts and transmits an update to the remote browser data on each update. For instance, if a cookie is updated or set, the remote browser data manager 127 may encrypt the cookie data and transmit the encrypted remote browser data to the remote browser client 117. In another embodiment, the remote browser data manager 127 batches updates to the remote browser data on a regular interval (e.g., 100 ms) and transmits the data only if there are changes. For instance, if there are 10 cookies that are updated or set within the interval, the remote browser data manager 127 may encrypt the remote browser data for those 10 cookies and transmit the update to the remote browser client 117 at the end of the interval. In a batch embodiment, the remote browser data manager 127 may encrypt each update separately or encrypt the entire remote browser data update.

The remote browser client 117 receives the encrypted remote browser data from the remote browser host 125 and stores the encrypted remote browser data 150 in the local client storage 145. The local client storage 145 may be local storage, IndexedDB, or other client storage available to the remote browser client 117. The remote browser client 117 does not have access to a key to decrypt the encrypted remote browser data 150.

In an embodiment, the remote browser data manager 127 periodically collapses updates to the remote browser data and sends the entire encrypted remote browser data to the remote browser client 117. The collapsing of the updates removes redundant data (e.g., outdated values of a cookie). The trigger to collapse the updates may be based on the size of the redundant data. For instance, if the size of the redundant data meets a threshold (e.g., 50%) of the total data, the remote browser data manager 127 may collapse the updates. Thus, at operation 250, the remote browser data manager 127 periodically collapses updates to the remote browser data and sends all the encrypted remote browser data to the remote browser client 117. The remote browser client 117 receives the entire encrypted remote browser data and removes any previous update from the local client storage 145.

When the remote browsing session 130 ends, (e.g., the remote browser client 117 is closed), the decrypted remote browser data 129 is removed in an embodiment.

In an embodiment, the remote browser session is implemented by the remote browser host transmitting draw commands to the remote browser client to execute as previously described. In another embodiment, the remote browser session is implemented through pixel pushing as previously described. In such an embodiment, the remote browser host transmits a series of images to the local browser as possibly compressed pixels or videos and also transmits the encrypted remote browser data. The page that is to include the rendered pixels or video may also include an iframe for receiving the encrypted remote browser data. In another embodiment, the remote browser session is implemented using DOM mirroring. In such an embodiment, the remote browser host transmits the cleaned up web page to the local browser and also transmits the encrypted remote browser data.

Figure 3:
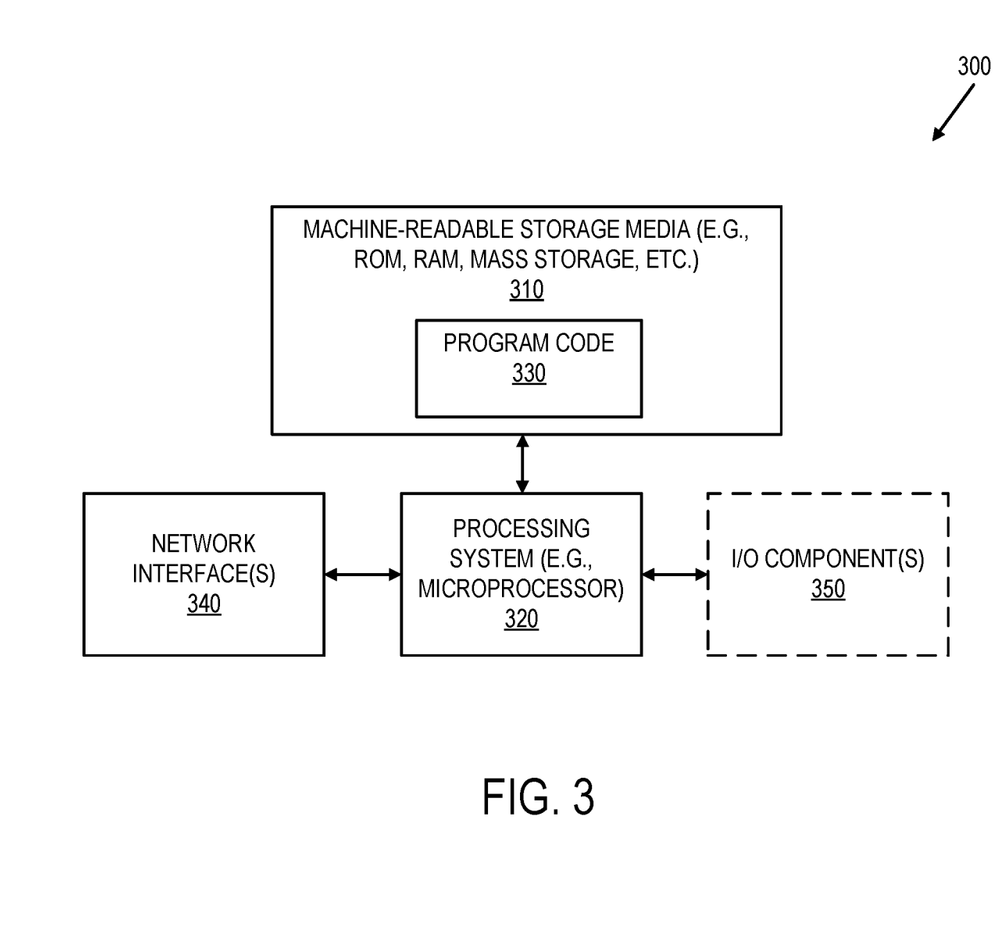
FIG. 3 illustrates a block diagram for an exemplary data processing system 300 that may be used in some embodiments.

FIG. 3 illustrates a block diagram for an exemplary data processing system 300 that may be used in some embodiments. One or more such data processing systems 300 may be used to implement the embodiments and operations described with respect to the remote browser server, client device, or other electronic devices. The data processing system 300 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 310 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 320 (e.g., one or more processors and connected system components such as multiple connected chips). For example, the depicted machine-readable storage media 310 may store program code 330 that, when executed by the processor(s) 320, causes the data processing system 300 to perform any of the operations described herein.

The data processing system 300 also includes one or more network interfaces 340 (e.g., a wired and/or wireless interfaces) that allows the data processing system 300 to transmit data and receive data from other computing devices, typically across one or more networks (e.g., Local Area Networks (LANs), the Internet, etc.). The data processing system 300 may also include one or more input or output ("I/O") components 350 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 300, and, in certain embodiments, fewer components than that shown in One or more buses may be used to interconnect the various components shown in FIG. 3.

The techniques shown in the figures can be implemented using code and data stored and executed on one or more electronic devices (e.g., a remote browser server, a client device, an origin server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth in order to provide a more thorough understanding of the present embodiments. It will be appreciated, however, by one skilled in the art that the invention may be practiced without such specific details. In other instances, control structures, gate level circuits and full software instruction sequences have not been shown in detail in order not to obscure understanding of the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   initiating a remote browsing session between a remote browser client executing on a client device and a remote browser host executing on a remote browser server;
   receiving, at the remote browser host from the client device, encrypted remote browser data of remote browser data that affects the remote browser session, wherein the remote browser client does not have access to a decryption key for the encrypted remote browser data;
   decrypting the encrypted remote browser data to reveal the remote browser data;
   configuring the remote browser host with the remote browser data;
   managing, at the remote browser host, updates to the remote browser data during the remote browsing session; and
   periodically encrypting and transmitting updates to the remote browser data to the remote browser client executing on the client device for storage.

2. The method of claim 1, further comprising:
   periodically collapsing updates to the remote browser data to remove redundant data;
   encrypting the collapsed updates to the remote browser data; and
   transmitting the encrypted collapsed updates to the remote browser data to the remote browser client.

3. The method of claim 1, further comprising:
   during the remote browsing session, intercepting a first set of one or more draw commands associated with output of the remote browser host;
   providing the first set of one or more draw commands to the remote browser client to cause the remote browser client to render one or more portions of output based on the first set of one or more draw commands;
   receiving input from the remote browser client; and
   executing the input at the remote browser host.

4. The method of claim 1, wherein the encrypted remote browser data is sent to an iframe loaded on the remote browser client.

5. The method of claim 1, wherein the encrypted remote browser data is to be stored through IndexedDB on the client device.

6. The method of claim 1, further comprising: responsive to the remote browsing session ending, deleting the remote browser data at the remote browser host.

7. The method of claim 1, wherein the encrypted remote browser data is an opaque binary blob.

8. A method on a client device, comprising:
   participating in establishing a first remote browsing session between a remote browser client executing on the client device and a first instance of a remote browser host executing on a remote browser server;
   during the first remote browsing session, periodically receiving encrypted remote browser data at the remote browser client, wherein the remote browser client does not have access to a decryption key for the encrypted remote browser data, and wherein the encrypted remote browser data is related to the first remote browsing session;
   persisting, on the client device, the encrypted remote browser data;
   exiting the first remote browsing session;
   participating in establishing a second remote browsing session between the remote browser client executing on the client device and a second instance of the remote browser host executing on the remote browser server; and
   during the establishing of the second remote browsing session, transmitting the persisted encrypted remote browser data to the second instance of the remote browser host for decryption and configuration of the second instance of the remote browser host with decrypted remote browser data.

9. The method of claim 8, wherein the encrypted remote browser data is stored on one of local storage and IndexedDB.

10. The method of claim 8, wherein the first remote browsing session includes:
    receiving a first set of one or more draw commands from the first instance of the remote browser host;
    rendering, by the remote browser client, one or more portions of output based on the first set of one or more draw commands;
    receiving, by the remote browser client, an input event;
    transmitting the input event to the first instance of the remote browser host;
    receiving a second set of one or more draw commands from the first instance of the remote browser host in response to the transmitted input event; and
    rendering, by the remote browser client, one or more portions of output based on the second set of one or more draw commands.

11. The method of claim 8, wherein the encrypted remote browser data is received at an iframe loaded on the remote browser client.

12. A non-transitory machine-readable storage medium that provides instructions that, when executed by a processing system cause operations to be performed comprising:
    initiating a remote browsing session between a remote browser client executing on a client device and a remote browser host executing on a remote browser server;
    receiving, at the remote browser host from the client device, encrypted remote browser data of remote browser data that affects the remote browser session, wherein the remote browser client does not have access to a decryption key for the encrypted remote browser data;
    decrypting the encrypted remote browser data to reveal the remote browser data;
    configuring the remote browser host with the remote browser data;
    managing, at the remote browser host, updates to the remote browser data during the remote browsing session; and
    periodically encrypting and transmitting updates to the remote browser data to the remote browser client executing on the client device for storage.

13. The non-transitory machine-readable storage medium of claim 12, wherein the operations further comprise:
    periodically collapsing updates to the remote browser data to remove redundant data;
    encrypting the collapsed updates to the remote browser data; and
    transmitting the encrypted collapsed updates to the remote browser data to the remote browser client.

14. The non-transitory machine-readable storage medium of claim 12, wherein the operations further comprise:
    during the remote browsing session, intercepting a first set of one or more draw commands associated with output of the remote browser host;

providing the first set of one or more draw commands to the remote browser client to cause the remote browser client to render one or more portions of output based on the first set of one or more draw commands;

receiving input from the remote browser client; and executing the input at the remote browser host.

15. The non-transitory machine-readable storage medium of claim 12, wherein the encrypted remote browser data is sent to an iframe loaded on the remote browser client.

16. The non-transitory machine-readable storage medium of claim 12, wherein the encrypted remote browser data is to be stored through IndexedDB on the client device.

17. The non-transitory machine-readable storage medium of claim 12, further comprising: responsive to the remote browsing session ending, deleting the remote browser data at the remote browser host.

18. The non-transitory machine-readable storage medium of claim 12, wherein the encrypted remote browser data is an opaque binary blob.

19. The method of claim 1, wherein the remote browser data includes one or more of:
    browser extension data;
    data to be stored in a local database of client device;
    one or more settings;
    browser history;
    autofill history;
    one or more bookmarks; and
    one or more passwords.

20. The method of claim 8, wherein the encrypted remote browser data includes one or more of:
    browser extension data;
    data to be stored in a local database of client device;
    one or more settings;
    browser history;
    autofill history;
    one or more bookmarks; and
    one or more passwords.

21. The non-transitory machine-readable storage medium of claim 12, wherein the remote browser data includes one or more of:
    browser extension data;
    data to be stored in a local database of client device;
    one or more settings;
    browser history;
    autofill history;
    one or more bookmarks; and
    one or more passwords.

22. A non-transitory machine-readable storage medium that provides instructions that, when executed by a processing system of a client device cause operations to be performed comprising:
    participating in establishing a first remote browsing session between a remote browser client executing on the client device and a first instance of a remote browser host executing on a remote browser server;
    during the first remote browsing session, periodically receiving encrypted remote browser data at the remote browser client, wherein the remote browser client does not have access to a decryption key for the encrypted remote browser data, and wherein the encrypted remote browser data is related to the first remote browsing session;
    persisting, on the client device, the encrypted remote browser data;
    exiting the first remote browsing session;
    participating in establishing a second remote browsing session between the remote browser client executing on the client device and a second instance of the remote browser host executing on the remote browser server; and
    during the establishing of the second remote browsing session, transmitting the persisted encrypted remote browser data to the second instance of the remote browser host for decryption and configuration of the second instance of the remote browser host with decrypted remote browser data.

23. The non-transitory machine-readable storage medium of claim 22, wherein the encrypted remote browser data is stored on one of local storage and IndexedDB.

24. The non-transitory machine-readable storage medium of claim 22, wherein the first remote browsing session includes:
    receiving a first set of one or more draw commands from the first instance of the remote browser host;
    rendering, by the remote browser client, one or more portions of output based on the first set of one or more draw commands;
    receiving, by the remote browser client, an input event;
    transmitting the input event to the first instance of the remote browser host;
    receiving a second set of one or more draw commands from the first instance of the remote browser host in response to the transmitted input event; and
    rendering, by the remote browser client, one or more portions of output based on the second set of one or more draw commands.

25. The non-transitory machine-readable storage medium of claim 22, wherein the encrypted remote browser data is received at an iframe loaded on the remote browser client.

26. The non-transitory machine-readable storage medium of claim 22, wherein the encrypted remote browser data includes one or more of:
    browser extension data;
    data to be stored in a local database of client device;
    one or more settings;
    browser history;
    autofill history;
    one or more bookmarks; and
    one or more passwords.

* * * * *